United States Patent [19]

Woudsma et al.

[11] Patent Number: 4,881,192

[45] Date of Patent: Nov. 14, 1989

[54] ONE-DIMENSIONAL LINEAR PICTURE TRANSFORMER

[75] Inventors: Roberto Woudsma; David C. H. Chong; Brian T. McSweeney; Stephanus M. C. Borgers; Egidius A. P. Habraken, all of Eindhoven, Netherlands

[73] Assignee: U.S. Philips Corporation, New York, N.Y.

[21] Appl. No.: 178,952

[22] Filed: Apr. 7, 1988

[30] Foreign Application Priority Data

Apr. 10, 1987 [NL] Netherlands ......................... 8700845

[51] Int. Cl.$^4$ ........................................... G06F 15/332
[52] U.S. Cl. ..................................... 364/725; 364/726
[58] Field of Search ................................ 364/725, 726

[56] References Cited

U.S. PATENT DOCUMENTS

| | | | |
|---|---|---|---|
| 4,138,730 | 2/1979 | Ali ....................................... | 364/726 |
| 4,449,194 | 5/1984 | Wilhelm ............................... | 364/725 |
| 4,675,836 | 6/1987 | Arnould et al. ..................... | 364/725 |
| 4,787,055 | 11/1988 | Bergeon et al. ..................... | 364/726 |
| 4,791,598 | 12/1988 | Liou et al. ........................... | 364/725 |

*Primary Examiner*—David H. Malzahn
*Attorney, Agent, or Firm*—Edward W. Goodman

[57] ABSTRACT

A one-dimension transformer for use in Transform Picture Coding converts each of a series of N input words into a series of N product words by multiplying this series and a transform matrix of N×N transform elements. This transformer has a main input connection bus (14.22) which receives the series of input words, a main output connection bus (14.29) at which the desired N product words occur successively and furthermore three data connection buses (14.23; 14.24; 14.25). For performing the required mathematical operations three circuits are provided; two combination circuits (14.30 and 14.31) for adding or subtracting data words applied thereto to generate result words at their outputs and a multiplier circuit 14.32 for multiplying a data word applied thereto by a mulitplication factor which is related to the transform elements to generate an auxiliary product word at its output. The associated output of each of these three circuits is connected to a different one of the three data connection buses. Furthermore a set of switches SW is associated with each of these three circuits, which switches are controlled in such a way that the input of the relevant circuit can be connected at any instant to at most one of the connection buses which are not connected to the output of the relevant circuit. The main output connection bus (14.29) is selectively connectable at any instant to at most one of the data connection buses (14.23; 14.24; 14.25) by means of a further set of switches (SW10, SW11, SW12).

6 Claims, 12 Drawing Sheets

$$\begin{pmatrix} 0.177 & 0.245 & 0.231 & 0.208 & 0.177 & 0.139 & 0.096 & 0.049 \\ 0.177 & 0.208 & 0.096 & -0.049 & -0.177 & -0.245 & -0.231 & -0.139 \\ 0.177 & 0.139 & -0.096 & -0.245 & -0.177 & 0.049 & 0.231 & 0.208 \\ 0.177 & 0.049 & -0.231 & -0.139 & 0.177 & 0.208 & -0.096 & -0.245 \\ 0.177 & -0.049 & -0.231 & 0.139 & 0.177 & -0.208 & -0.096 & 0.245 \\ 0.177 & -0.139 & -0.096 & 0.245 & -0.177 & -0.049 & 0.231 & -0.208 \\ 0.177 & -0.208 & 0.096 & 0.049 & -0.177 & 0.245 & -0.231 & 0.139 \\ 0.177 & -0.245 & 0.231 & -0.208 & 0.177 & -0.139 & 0.096 & -0.049 \end{pmatrix}$$

FIG. 5

$$p_0 = C_{16}^4 \left[ \{(d_0+d_7)+(d_3+d_4)\} + \{(d_1+d_6)+(d_2+d_5)\} \right]$$

$$p_4 = C_{16}^4 \left[ \{(d_0+d_7)+(d_3+d_4)\} - \{(d_1+d_6)+(d_2+d_5)\} \right]$$

$$p_0 = C_{16}^4 \left[(d_0+d_7)+(d_3+d_4)\right] + C_{16}^4 \left[(d_1+d_6)+(d_2+d_5)\right]$$

$$p_4 = C_{16}^4 \left[(d_0+d_7)+(d_3+d_4)\right] - C_{16}^4 \left[(d_1+d_6)+(d_2+d_5)\right]$$

$$p_2 = (C_{16}^2 - C_{16}^6)\left[(d_0+d_7)-(d_3+d_4)\right] +$$
$$+ C_{16}^6 \left[(d_1+d_6)-(d_2+d_5)+(d_0+d_7)-(d_3+d_4)\right]$$

$$p_6 = C_{16}^2 \left[(d_1+d_6)-(d_2+d_5)+(d_0+d_7)-(d_3+d_4)\right] +$$
$$+ (-C_{16}^2 - C_{16}^6)\left[(d_1+d_6)-(d_2+d_5)\right]$$

$$p_1 = (C_{16}^1 - C_{16}^7)(d_0-d_7) + (C_{16}^7 - C_{16}^3)\left[(d_3-d_4)+(d_0-d_7)\right] +$$
$$+ C_{16}^3 \left[(d_3-d_4)+(d_2-d_5)+(d_1-d_6)+(d_0-d_7)\right] +$$
$$+ (C_{16}^5 - C_{16}^3)(d_2-d_5)$$

$$p_3 = C_{16}^3 \left[(d_3-d_4)+(d_2-d_5)+(d_1-d_6)+(d_0-d_7)\right] +$$
$$+ (-C_{16}^5 - C_{16}^3)(d_3-d_4) + (-C_{16}^7 + C_{16}^1)(d_1-d_6) +$$
$$+ (-C_{16}^1 - C_{16}^3)\left[(d_2-d_5)+(d_1-d_6)\right]$$

$$p_5 = (C_{16}^5 - C_{16}^3)(d_0-d_7) +$$
$$+ C_{16}^5 \left[(d_3-d_4)+(d_2-d_5)+(d_1-d_6)+(d_0-d_7)\right] +$$
$$+ (-C_{16}^1 - C_{16}^3)\left[(d_2-d_5)+(d_1-d_6)\right] + (C_{16}^7 + C_{16}^1)(d_2-d_5)$$

$$p_7 = (C_{16}^7 - C_{16}^3)\left[(d_3-d_4)+(d_0-d_7)\right] + (-C_{16}^1 - C_{16}^7)(d_3-d_4) +$$
$$+ (-C_{16}^5 - C_{16}^3)(d_1-d_6) +$$
$$+ C_{16}^3 \left[(d_3-d_4)+(d_2-d_5)+(d_1-d_6)+(d_0-d_7)\right]$$

| R3 $r_0\ r_1\ r_2\ r_3\ r_4\ r_5\ r_6\ r_7\ r_8\ r_9\ r_{10}\ r_{11}$ | R4 $r_0\ r_1\ r_2\ r_3\ r_4\ r_5\ r_6\ r_7\ r_8\ r_9\ r_{10}\ r_{11}$ | A/S (2) | OUT |
|---|---|---|---|
| $z_{11}\ z_{12}\ z_5\ z_6$ | | | |
| $p'_3\ p'_7\ p'_5\ p'_1$ | $z_8\ z_9\ z_{14}\ z_{15}\ z_7\ z_{13}$ | $z_{11}+z_8=p'_3$ $z_{12}+z_9=p'_7$ $z_{14}+z_5=p'_5$ $z_{15}+z_6=p'_1$ | |
| $p''_3\ p''_5$ $z_4\ z_0\ p''_7\ p''_1$ | $z_{10}$ | $p'_3+z_7=p''_3$ $p'_5+z_7=p''_5$ $p'_7+z_{13}=p''_7$ $p'_1+z_{13}=p''_1$ | |
| $z_3$ $p_1\ p_3\ p_0\ p_4$ | $z_1\ z_2$ | $p''_1+z_{10}=p_1$ $p''_3+z_{10}=p_3$ $z_0+z_1=p_0$ $z_0-z_1=p_4$ | |
| $z_{11}\ z_{12}\ z_5\ z_6$ | $p_2\ p_6\ p_5\ p_7$ | $z_4+z_2=p_2$ $z_3+z_2=p_6$ $p''_5+z_{10}=p_5$ $p''_7+z_{10}=p_7$ | |
| $p'_3\ p'_7\ p'_5\ p'_1$ | $z_8\ z_9\ z_{14}\ z_{15}\ z_7\ z_{13}$ | $z_{11}+z_8=p'_3$ $z_{12}+z_9=p'_7$ $z_{14}+z_5=p'_5$ $z_{15}+z_6=p'_1$ | $p_0$ $p_1$ $p_2$ |
| $p''_3\ p''_5$ $z_4\ z_0\ p''_7\ p''_1$ | $z_{10}$ | $p'_3+z_7=p''_3$ $p'_5+z_7=p''_5$ $p'_7+z_{13}=p''_7$ $p'_1+z_{13}=p''_1$ | $p_3$ $p_4$ |
| $z_4$ $p_1\ p_3\ p_0\ p_4$ | $z_1\ z_2$ | $p''_1+z_{10}=p_1$ $p''_3+z_{10}=p_3$ $z_0+z_1=p_0$ $z_0-z_1=p_4$ | $p_5$ $p_6$ |
| $z_{11}\ z_{12}\ z_5\ z_6$ | $p_2\ p_6\ p_5\ p_7$ | $z_4+z_2=p_2$ $z_3+z_2=p_6$ $p''_5+z_{10}=p_5$ $p''_7+z_{10}=p_7$ | $p_7$ $p_0$ |
| $p'_3\ p'_7$ | $z_8\ z_9\ z_{14}$ | $z_{11}+z_8=p'_3$ $z_{12}+z_9=p'_7$ $z_{14}+z_5=p'_5$ | $p_1$ $p_2$ $p_3$ |

ONE-DIMENSIONAL LINEAR PICTURE TRANSFORMER

BACKGROUND OF THE INVENTION (1) Field of the Invention

The invention generally relates to Transform Picture Coding. In broad outline this is a method of converting an array of N×N multibit input data words into an array of N×N multibit output data words by means of a two-dimensional linear transform. More particularly, an array of pixels of a television picture is converted into an array of so-called coefficients, or conversely. In the former case the term forward linear transform is generally used and in the latter case the term inverse linear transform is generally used.

Transform Picture Coding is a subject which is currently in the limelight because it appears to be the means to realise a significant bit rate reduction in the transmission of television pictures in a digital form and having a predetermined quality.

It can be used in television broadcasting systems in which the atmosphere is the transmission medium, in video conference systems in which a transmission cable is usually present as a transmission medium and also in video recorders in which a magnetic tape is the transmission medium.

(2) Description of the Prior Art

It is generally known that for performing a forward two-dimensional linear transform the television picture is split up into sub-pictures each of N×N pixels and each sub-picture is considered as a sum of N×N mutually orthogonal basic pictures $B_{i,k}$ each also of N×N pixels and each with its own weighting factor $y_{i,k}$. Here it applies that i, k=0, 1, 2, ..., N-1. These weighting factors are commonly referred to as the coefficients of the linear transform.

Due to the correlation between the pixels of a sub-picture the information is concentrated in a limited number of basic pictures. Only the associated weighting factors are important and the other weighting factors can be ignored.

In order to determine these weighting factors, a sub-picture is considered as an array X of N×N pixels $X_{i,k}$. Furthermore an orthogonal N×N transform matrix A is defined which relates to the selected collection of basis pictures $B_{i,k}$. More particularly it holds that:

$$B_{i,k} = A_i A_k^T \quad (1)$$

In this expression $A_i$ represents an N×N matrix in which each column is equal to the i-th column of the transform matrix A and $A_k^T$ represents an N×N matrix each row of which is equal to the k-th row of the matrix A.

If the weighting factors $Y_{i,k}$ are assumed to form the elements of N×N coefficient array Y, the said coefficients then follow from the matrix multiplication $$Y = A^T X A \quad (2)$$

In this expression $A^T$ represents the transposed matrix of A.

For more information relating to the above reference is made to Reference 1.

For the calculation of the coefficients in accordance with expression (2) both the transform matrix A and its transposed version should be available. Expression (2) is, however, equivalent to $$Y^T = (XA)^T A \quad (3)$$

This matrix multiplication only requires the matrix A. More particularly the product array P=XA can be calculated first, subsequently P can be transposed and finally $Y^T = P^T A$ can be calculated.

In order to recover the original array X of pixels from the array Y of coefficients thus obtained, this array Y is subjected to an inverse two-dimensional transform. This is defined as follows.

$$X = A Y A^T \quad (4)$$

This expression is in its turn equivalent to $$X = A(AY^T)^T \quad (5)$$

Starting from the array $Y^T$ the product matrix $P' = AY^T$ can be calculated first. Subsequently P' can be transposed and finally the product $X = AP'^T$ can be determined.

The above-mentioned product matrices P=XA, $Y^T = P^T A$, $P' = AY^T$ and $X = AP'^T$ are each obtained from a series of so-called vector matrix multiplications. For example, for obtaining the product matrix P a row of X is multiplied by each column of A in order to obtain the corresponding row of P. Generally a vector matrix multiplication will hereinafter be referred to as a one-dimensional transform and a device for performing such a transform will be referred to as a one-dimensional transformer. More particularly the product arrays P and $Y^T$ are obtained by one-dimensional forward transformation of X and $P^T$, respectively and the product arrays P' and X are obtained by one-dimensional inverse transformation of $Y^T$ and $P'^T$, respectively.

OBJECT AND SUMMARY OF THE INVENTION

The invention has for its object to provide a one-dimensional transformer which is programmable and can thus be used flexibly and is suitable for performing both a one-dimensional forward transform and a one-dimensional inverse transform and which is furthermore eminently suitable for VLSI implementation.

According to the invention this one-dimensional transformer is adapted to multiply a received series of N input words with a transofmr matrix of N×N predetermined transform elements for generating a series of N product words, and is provided with:

an input bus connection for receiving the input words;

an output bus connection at which the product words occur, a main input connection bus which is connected to the input bus connection;

a main output connection bus which is connected to the output bus connection;

a group of data connection buses; a number of combination circuits each having an input bus connection and an output bus connection and each adapted to add or subtract each time two data words received successively at its input bus connection for supplying result words to its output bus connection, the output bus connections of said combination circuits being connected to particular respective data connection buses;

a multiplier circuit each having two input bus connections and an output bus connection, the latter being connected to the remaining data connection bus and the input bus connections being adapted to receive data words and multiplication factors, respectively, said multiplier circuits being adapted to multiply a received data word by an appropriate multiplication factor for generating an auxiliary product word at its output bus connection;

a multiplication factor memory having addressable memory locations each adapted to store a multiplication factor, said multiplication factors being related to the transform elements and said memory being provided with a multiplication factor output bus which is connected to one of the input bus connections of the multiplier circuit;

a plurality of switching means each controlled by associated control data, each combination circuit and the multiplier circuit having associated therewith one of said plurality of switching means, each switching means being adapted to connect selectively the input bus connection of the circuit with which they are associated at any instant to at most one of said connection buses which is not connected to the output bus connection of the relevant circuit;

further switching means which are controlled by further control data for connecting selectively the main output connection bus at any instant to at most one of the data connection buses; and a control memory having a control bus which is connected to the said switching means and which is adapted to store at least the said control data and to supply selectively said control data to the control bus.

Because of the special connection pattern between the different input bus connections and output bus connections it is realised that data transport can take place simultaneously through the main input bus and all data connection buses without these transports influencing each other.

The one-dimensional transform (forward or inverse) to be performed not only determines the multiplication factors but also the sequence in which connections must be established by the different switching means. These connections are dictated by the control data in the control memory. For the latter a programmable memory can be used so that the device obtained is programmable.

It is to be noted that in practical embodiments the multiplication factor memory will form part of the control memory.

REFERENCES

1. Real-time Orthogonal Transformation of Colour Television pictures; H. Bacchi, A. Moreau; Philips Technical Review, Vol. 38, no. 4/5, 1978/1979 pages 119–130.

2. Method and Arrangement for Digitizing a Colour Video Signal: J. H. Peters; U.S. Pat. No. 4,405,936.

3. Multiport Register File; Daniel F. Chan; U.S. Pat. No. 4,491,937.

4. Multiport Register Implementation; A. Furman; U.S. Pat. No. 4,554,645.

5. Terminology in Digital Signal Processing; L. R. Rabiner, C. S.; IEEE Transactions on Audio and Electroacoustics, Vol. AU-20, No. 5, December 1972, pages 322–337.

BRIEF DESCRIPTION OF THE FIGURES

FIG. 7 shows a modification of the equations shown in FIG. 6.

EXPLANATION OF THE INVENTION (1). General Structure of a Video Recorder

Figure 1:
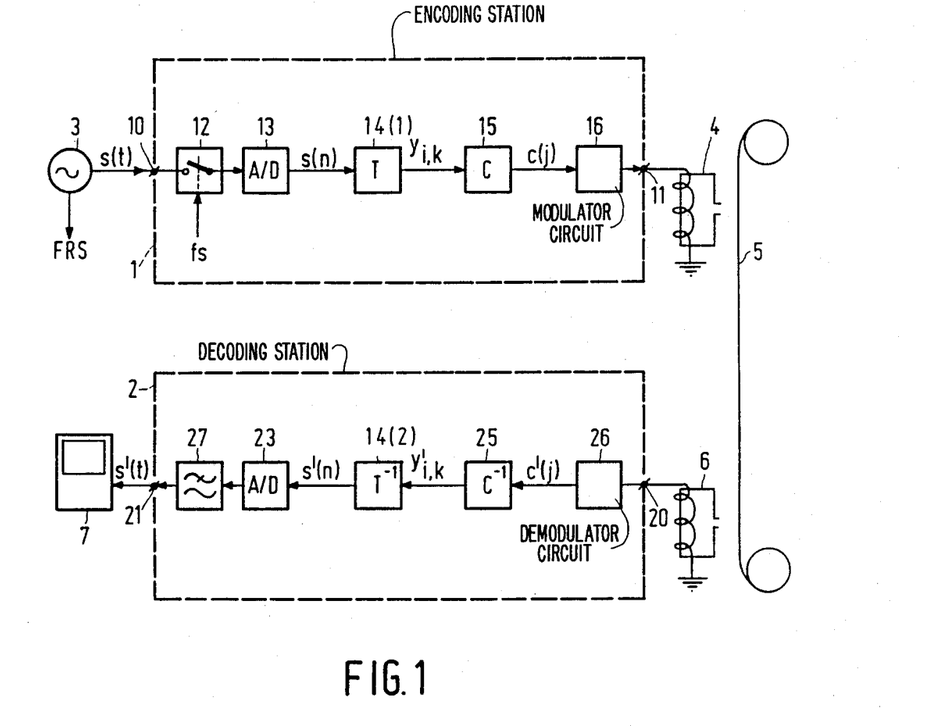
FIG. 1 shows diagrammatically a video recorder in which Transform Picture Coding is used.

FIG. 1 shows a diagrammatically a video recorder. It comprises an encoding station 1 and a decoding station 2. The encoding station 1 has an input 10 for the reception of a picture signal s(t) which is supplied by a picture signal source 3; for example a video camera. The output 11 of this encoding station is connected to a write head 4 by means of which the processed analog picture signals s(t) can be registered on a magnetic tape 5. To regain the original picture signal, a read head 6 is connected to the input 20 of the decoding station for converting the information present on the magnetic tape 5 into electrical signals. The decoding station 2 supplies an analog picture signal s'(t) from its output 21, which signal can be applied to a monitor 7.

In the encoding station 1 the analog picture signal s(t) is sampled in a sampling circuit 12 at a suitably chosen sampling frequency of approximately 10 MHz so that a series of picture signal samples, also referred to as pixels, is obtained. Each pixel is encoded in an analog-to-digital converter 13 into, for example, an 8-bit PCM word s(n). Furthermore these pixels are applied to a transform device 14(1) for performing a forward two-dimensional linear transform. Although the structure of this transform device 14(1) will be further described, it is to be noted that it divides each television picture into sub-pictures of N×N pixels $x_{i,k}$ each and transforms each sub-picture into an array of N×N weighting factors or coefficients $y_{i,k}$. Here it holds that i,k=0, 1, 2, . . . N−1. These weighting factors are subsequently applied to an encoding circuit 15, for example a so-called scene adaptive encoder many examples of which have been described in literature.

It converts each array of N×N coefficients into an auxiliary array of N×N quantised coefficients which differs from the original array in that the value of zero is allocated to the least significant coefficients. Subsequently the coefficients different from zero are coded with more or fewer bits in dependence upon their significance. Thus, for each sub-picture a series of transmission words c(j) of variable length occurring serially and associated with a given array is produced at the output of this encoding circuit 15. The bits of these transmission words are applied via a digital channel modulator circuit 16 to the write head 4 and are registered on the magnetic tape.

In the decoding station 2 the signal supplied by the read head 6 is converted in a demodulator circuit 26 into transmission words c'(j) which correspond to the transmission words c(j) received in the encoding station by the modulator circuit 16. These transmission words c'(j) are applied to a decoding circuit 25 which converts each series of transmission words by addition of transmission words of the value zero into an array Y' of N×N coefficients $y'_{i,k}$ which corresponds to the auxiliary array produced in the encoding circuit. This array Y' thus obtained is subsequently applied to a transform device 14(2) which is adapted to perform an inverse linear transform but whose structure is the same as that of the transform device 14(1). This transform device 14(2) converts the array Y' into an array X' of N×N pixels $x'_{i,k}$. This transform device supplies the series of picture signal samples s'(n) by placing the pixels of different arrays X' one after the other. These picture signal samples s'(n) are subsequently applied to a series arrangement of a digital-to-analog converter 23 and a low-pass filter 27 by which the analog picture signal s'(t) is obtained which can be displayed on the monitor 7 and which corresponds to the picture signal s(t) supplied by the signal source 3.

It is to be noted that in this embodiment the picture signal source 3 supplies a picture reset pulse FRS each time at the end of each full picture, which pulse can be used for different purposes.

(2) The Transform Device

Figure 2A:
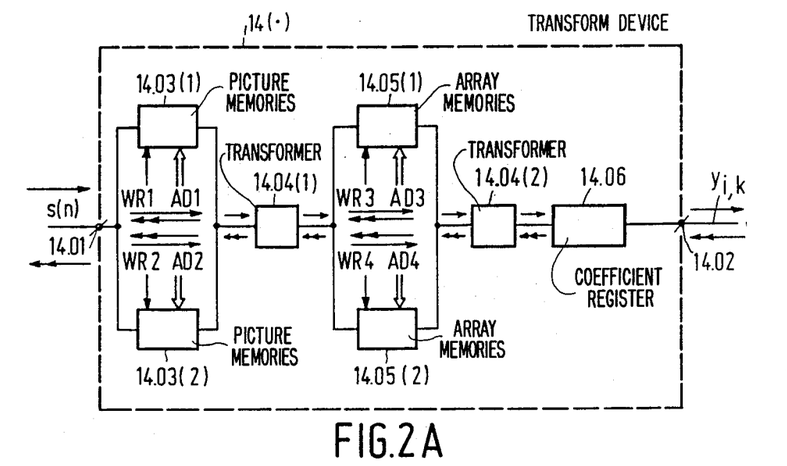
FIG. 2A shows a device for performing a two-dimensional transform, and provided with two one-dimensional transformers.

FIG. 2A shows the general structure of the transform device 14 (.). It has a terminal 14.01 at which the pixels s(n) occur and a terminal 14.02 at which the coefficients $y_{i,k}$ occur. In conformity with the foregoing, it will be assumed that these are the coefficients of the coefficient array $Y^T$. Furthermore two one-dimensional transformers 14.04(1) and 14.04(2) are provided and the transform matrix A is associated with each of them. The transformer 14.04(1) is connected via two parallel-arranged picture memories 14.03(.) and terminal 14.04. Both transformers are mutually coupled by means of two parallel-arranged array memories 14.05(.) and transformer 14.04(2) is connected to terminal 14.02 by means of a coefficient register 14.06.

The memories 14.03(.) are each provided with addressable memory locations and are controlled by write-read commands WR1 and WR2 in such a manner that information is written in one of them while simultaneously information present in the other memory is read. The address AD1, AD2 applied to the relevant memory determines at which memory location information is stored or which information is read.

The memories 14.05(.) are controlled in a corresponding manner by the read-write commands WR3 and WR4 and the addresses AD3 and AD4.

Figure 3:
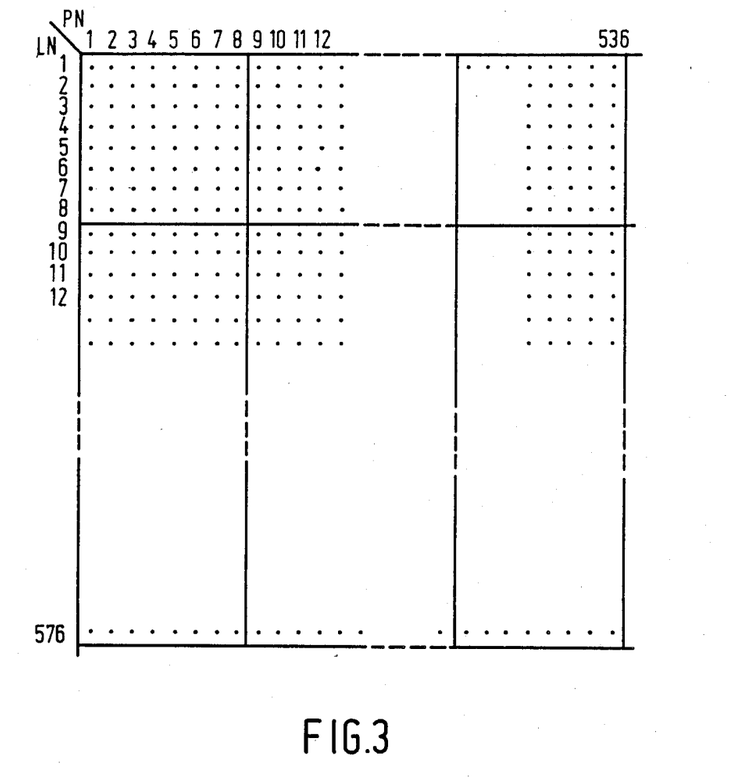
FIG. 3 shows the visible part of a television picture built up from pixels and divided into subpictures.

Although the memories 14.03(.) and 14.05(.) are controlled in a corresponding manner, that is to say, information is written in one memory and read in the other, these memories are distinguished by their capacity. More particularly the memory 14.03(.) comprises at least as many rows of memory locations as there are visible lines in a TV picture and each row comprises as many memory locations as there are visible pixels in a TV line. Such a memory is shown diagrammatically in FIG. 3. In this Figure the reference LN denotes the row number of the memory and PN denotes the location number on the line (also referred to as the column number). The array memory 14.05(.) has a capacity which is at least equal to the dimensions of the transform matrix A.

Dependent on the fact whether in this transform device either a two-dimensional forward transform or a two-dimensional inverse transform must be performed, the data flow in this device is denoted in the direction of the single arrows or in the direction of the double arrows.

Although it may be clear to those skilled in the art, the operation of this transform device will be further described. It will be assumed that it is intended to perform the two-dimensional forward transform defined in expression (3).

Of the pixels s(n) of the television picture presented to terminal 14.01, the visible pixels are stored line by line in a picture memory 14.03(.). First the pixels of the odd lines and then those of the even lines. Finally this picture memory comprises the pixels denoted by dots in FIG. 3.

When reading the contents of a picture memory this memory is split up, as it were, into a plurality of sub-memories of N×N memory locations each or, in other words, each picture is split up into a plurality of sub-pictures each of N×N pixels. Such a division is shown diagrammatically for N=8 in FIG. 3. The contents of such a sub-memory are considered to be an array of pixels and will be denoted by X. The pixels of such an array are read successively and row by row and are applied to the first one-dimensional transformer 14.04(1).

In this transformer 14.04(1) this array of pixels is multiplied by a fixed N×N transform matrix A. It supplies successively and row by row the product words of the N×N product array P=MA. These product words are stored in the array memory 14.05(.). Subsequently the product words are read successively and column and column and are applied to the second transformer 14.04(2). This transformer thus receives the transposed version $P^T$ of the product array P, multiplies it also by the transform matrix A and thus supplies successively and row by row the product words evaluated as coefficients of the N×N coefficient matrix $Y^T$. These coefficients are temporarily stored in the coefficient register 14.06.

Figure 2B:
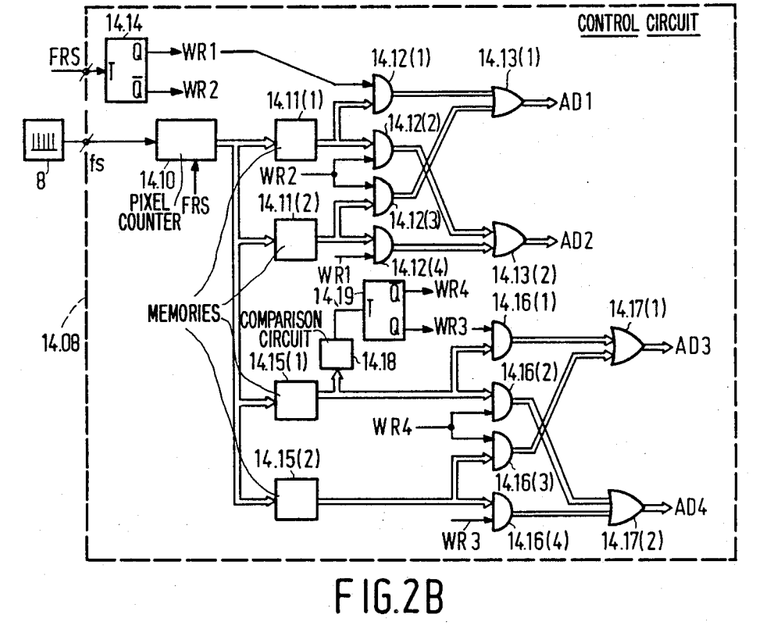
FIG. 2B shows a control circuit for controlling the device of FIG. 2A.

For controlling the transform device shown in FIG. 2A the control circuit shown in FIG. 2B is provided. It receives clock pulses occurring at a rate $f_s$ from a clock pulse generator 8. It is to be noted that these clock pulses are also applied as sampling pulses to the sampling circuit 12 (see FIG. 1). In this control circuit they are applied to a pixel counter 14.10 whose counting position ranges from zero to a number which is equal to the number of pixels constituting a full picture. This counter is reset at the commencement of each new picture by picture reset pulses FRS which are supplied by the video signal source 3 (FIG. 1). The counting positions of this pixel counter are applied as addresses to two memories 14.11(1) each in the form of a ROM. The ROM 14.11(1) supplies the addresses for the picture memories 14.03(.) in the sequence in which pixels must be read (read addresses), whilst the ROM 14.11(2) supplies the addresses for the picture memories 14.03(.) in the sequence in which pixels must be written into the picture memory (write addresses). The addresses supplied by these ROMs 14.11(.) are applied via AND gate circuits 14.12(.) and OR gate circuits 14.13(.) to the picture memories 14.03(.).

In order to achieve that the read and write addresses applied to a picture memory 14.03(.) alternate with each other for each new picture, the picture reset pulses FRS are also applied to a T-flip-flop 14.14. Its Q output supplies the write-read command WR1 and its $\overline{Q}$ output supplies the write-read command WR2. These commands are applied in the manner shown to the AND gate circuits 14.12(.).

For generating the read and write addresses for the array memories 14.05(.) the counting positions of pixel counter 14.10 are also applied to two further memories 14.15(.) which are both in the form of ROMs. The ROM 14.15(1) comprises the N×N read addresses for the array memories and the ROM 14.15(2) comprises the N×N write addresses. These addresses supplied by the two ROMs 14,15(.) are applied via AND gate circuits 14.16(.) and OR gate circuits 14.17(.) to the array memories.

In order to achieve that the read and write addresses alternate with each other for each new array (sub-picture), the read addresses of ROM 14.15(1) are also applied to a comparison circuit 14.18 which applies a control pulse to the T input of a T-flip-flop 14.19 whenever a predetermined read address occurs. The Q output of this T-flip-flop supplies the write-read command WR3 and its $\overline{Q}$ output supplies the write-read command WR4. These commands are applied to the AND gate circuits 14.16(.) in the manner shown.

If the device shown in FIG. 2A is intended to perform the two-dimensional inverse transform defined in expression (5), the coefficients of the N×N coefficient array $Y^T$ presented to terminal 14.02 are applied successively and row by row to the transformer 14.04(2) via the coefficient register 14.06. In this transformer such a coefficient array is multiplied by the N×N transform matrix A. This transformer thus supplies successively and row by row the product words of the N×N product array $P' = AY^T$. These product words are stored in the array memory 14.05(.). Subsequently the product words are read successively and column by column and are applied to the transformer 14.04(1). This transformer thus receives the transposed version $P'^T$ of the product array P, multiplies this array also by the transform matrix A and thus supplies successively and row by row the product words evaluated as pixels of a sub-picture of N×N pixels. Such a sub-picture is again stored in a suitable sub-memory of a picture memory 14.03(.). After all sub-memories of the picture memory have been provided with a new sub-picture, the pixels in this picture memory are read successively and row by row so that the series of pixels s(n) is obtained.

(3) The One-dimensional Transformer

To generalise the foregoing an element applied to the transformer 14.04(.) (such as a pixel, a product word, a coefficient) will hereinafter be referred to as an input word and the element which it supplies (such as a product word, a coefficient, a pixel) will be referred to as a product word.

Furthermore it is assumed that the transform matrix A which is associated with this transformer 14.04(.) is an N×N matrix so that in this transformer each of a series of N input words is converted into a series of N product words. The input words of such a series will be denoted by $d_0, d_1, d_2, \ldots d_{N-1}$ and the product words of the series obtained will be denoted by $p_0, p_1, \ldots p_{N-1}$, respectively.

Figure 4:
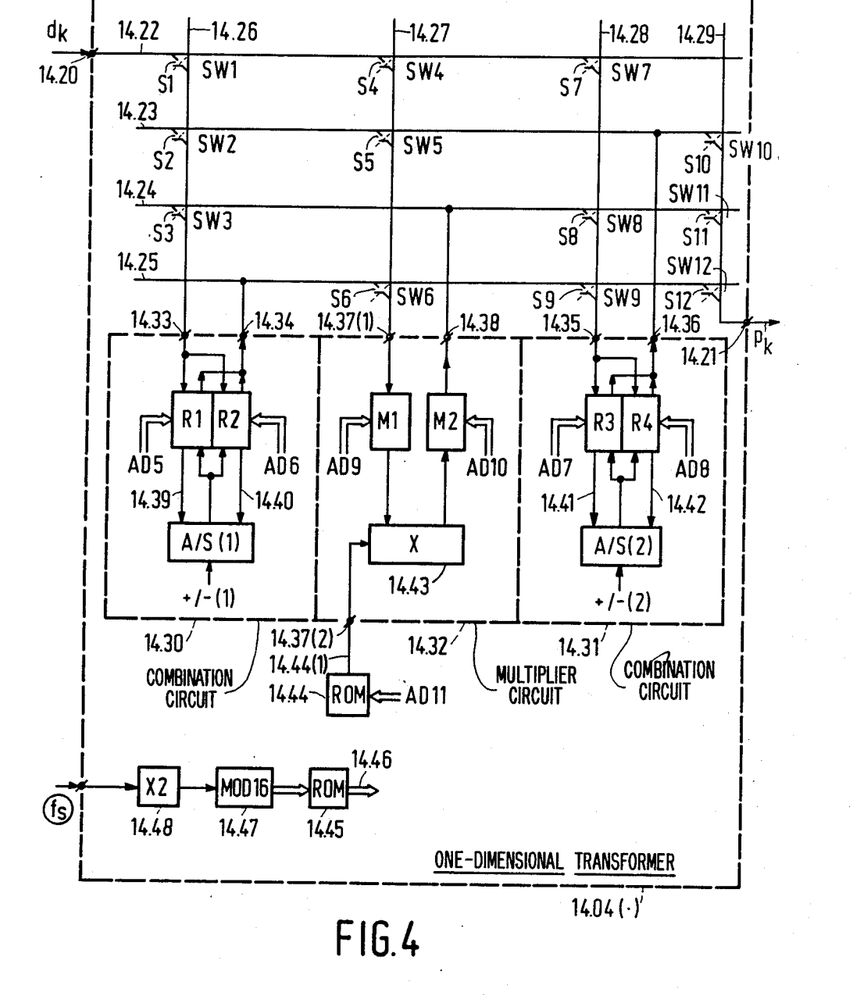
FIG. 4 shows an embodiment of the one-dimensional transformer.

An embodiment of each of the one-dimensional transformer 14.04(.) is shown in FIG. 4. It has an input bus connection 14.20 and an output bus connection 14.21. A main input connection bus 14.22 across which the input words $d_k$ are transported is connected to the input bus connection. It is to be noted that the bits of the different words are assumed to be available in parallel so that a bus has at least as many parallel lines as the word which is transported thereacross has bits. The transformer also comprises a first, second and third data connection. buses 14.23, 14.24, 14.25, respectively, first, second and third column buses 14.26, 14.27, 14.28 and a main output connection bus 14.29. The latter bus is connected to the output bus connection 14.21. The first column bus 14.26 is selectively connectable at any instant to not more than one of a first set of connection buses 14.22, 14.23, 14.24 by means of a first set of switches SW1, SW2, SW3. The second column bus 14.27 is selectively connectable at any instant to not more than one bus of a second set of connection buses 14.22, 14.23, 14.25 by means of a second set of switches SW4, SW5, SW6. The third column bus 14.28 is selectively connectable at any instant to not more than one bus of a third set of connection buses 14.22, 14.24, 14.25 by means of a third set of switches SW7, SW8, SW9. Finally, the main output connection bus is selectively connectable at any instant to not more than one of the data connection buses 14.23, 14.24, 14.25 by means of a fourth set of switches SW10, SW11, SW12. The three switches SW1, SW2, SW3 of the first set are controlled by the respective first control signals S1, S2, S3. The three switches SW4, SW5, SW6 of the second set are controlled by the respective second control signals S4, S5, S6. The three switches SW7, SW8, SW9 of the third set are controlled by the respective third control signals S7, S8, S9. Finally, the three switches SW10, SW11, SW12 of the fourth set are controlled by the respective control signals S10, S11, S12. The logic state of the control signal controlling a given switch determines whether this switch has established a connection at a given instant.

The one-dimensional transformer further comprises a first combination circuit 14.30, a second combination circuit 14.31 and a multiplier circuit 14.32.

The first combination circuit 14.30 has an input bus connection 14.33 which is connected to the first column bus 14.26 and it has an output bus connection 14.34 which is connected to the third connection bus 14.25. The second combination circuit 14.31 has an input bus connection 14.35 which is connected to the third column bus 14.28. Furthermore it has an output bus connection 14.36 which is connected to the first connection bus 14.23. The multiplier circuit 14.32 has two input bus connections 14.37(1) and 14.37(2). The first connection is connected to the second column bus 14.27. It is also provided with the output bus connection 14.38 which is connected to the second connection bus 14.24.

The combination circuits 14.30 and 14.31 each comprise two register banks R1, R2 and R3, R4, respectively of, for example, 12 registers of 12 bits. More particularly they are each formed by a so-called multiport register bank. Embodiments of these register banks are widely known. Some more interesting embodiments have recently been published in References 3 and 4. The characteristic feature of such register banks is that a given register can be written into while simultaneously the contents of another register can be read. An address determines which register is written into or from which register the contents are read. In the Figure the addresses for the registers banks R1, ..., R4 are denoted by AD5, AD6, AD7, AD8, respectively. Each of these register banks has an input which is connected to the input bus connection 14.33 and 14.35, respectively and an output which is connected to the output bus connection 14.34 and 14.36, respectively, of the relevant combination circuit. They may also be provided with further outputs 14.39, 14.40 and 14.41, 14.42 which are connected to inputs of an adding/subtracting unit A/S(.). These units receive via a further input an adding/subtracting command $+/-(.)$ and supply sum or difference words which are optionally stored in a register of register bank R1 or R2 or in a register of register bank R3 or R4, respectively.

The multiplier circuit 14.32 has in input register bank M1 and an output register bank M2 each with, for example, not more than four 12-bit registers addressable by addresses AD9 and AD10, respectively. An input of register bank M1 is connected to the input bus connection 14.37(1) and an output is connected to a first input of a multiplier 14.43. This multiplier also receives a cyclic series of multiplication factors which are applied to the input bus connection 14.37(2) and supplies product words at an output. These are stored in a register of the output register bank M2 whose output is connected to the output bus connection 14.38. The said multiplication factors receives by the multiplier 14.43 are supplied by a memory unit 14.44 and are applied via a multiplication factor output bus 14.44(1) to the input bus connection 14.37(2) of the multiplier circuit. This memory unit 14.44 has memory locations which are addressable by means of an address AD11.

For generating the different addresses, the control signals for the different switching devices SW and the adding subtracting commands $+/-(.)$, this one-dimensional transformer is provided with a memory 14.45 with addressable memory locations (for example a ROM). Each memory location comprises a plurality of bits which define the state of all transformer circuits to be controlled at any moment, i.e. the state of the switches SW, the different addresses, and so forth. It appears in practice that approximately 70 bits per instant may suffice and that 16 of these 70 bits memory locations are required both for performing a forward Discrete Cosine Transform and, for performing an inverse Discrete Cosine Transform. These bits are applied by means of a bus 14.46 of approximately 70 parallel lines to the different elements of the circuit. This memory is in turn addressed by the counting positions of a counter circuit 14.47 (a modulo-16-counter in the case of a DCT) which receives counting pulses from a frequency multiplier 14.48. The latter multiplies the frequency of the clock pulses applied thereto by a factor of 2. The said clock pulses occur at the sampling frequency $f_s$ and are supplied, for example by the clock pulse generator 8 shown in FIG. 2B.

To explain the operation of the one dimensional transformer shown in FIG. 4 it is assumed that the transform matrix A is the discrete cosine transform matrix and that the one-dimensional transforms (forward and inverse) are performed in accordance with the algorithms which will be explained in the following section.

(4) A DCT Algorithm

The elements $a_{i,k}$ of the N×N discrete cosine transform matrix A are defined as follows:

$$a_{i,k} = De_k\cos\{\pi(2i+1)k/(2N)\} \quad (6)$$
$$i,k = 0, 1, 2, \ldots N-1$$
$$e_k = 1/\sqrt{2} \text{ when } k = 0$$
$$\phantom{e_k} = 1 \text{ when } k > 0$$

with D being a scaling constant which is equal to 2/N if the matrix is used for performing a forward transform and which is equal to 1 if it is used for performing an inverse transform.

Figure 5:
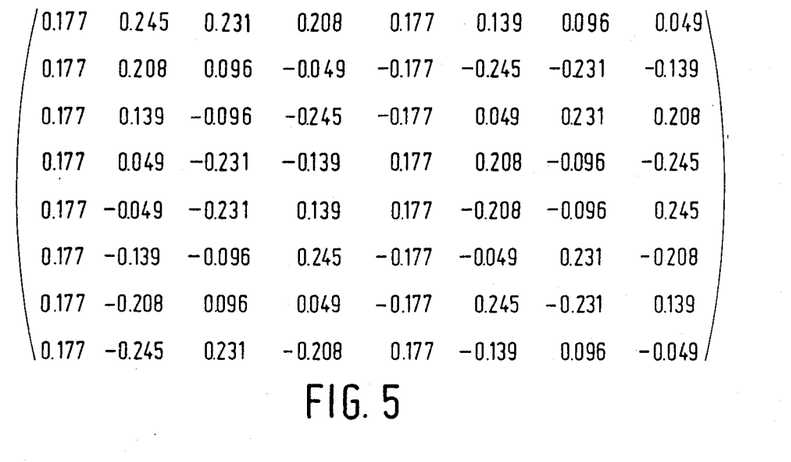
FIG. 5 shows an 8×8 DCT matrix.

The DCT matrix is shown in FIG. 5 for N=8. As is apparent therefrom this DCT matrix has a very specific structure due to the periodical character of the cosine function. More particularly only N−1 (=7) digits which are mutually different in absolute value can be recognized in this matrix. These digits will be referred to as transform elements and will be indicated by $C^m_{2N}$ with m=0, 1, 2, ... N−1. The absolute value of each element $a_{i,k}$ of the discrete cosine transform matrix can be equated to such a transform element if these elements are defined as follows:

$$C^m_{2N} = D\cos[\pi m/(2N)] \quad (7)$$

Figure 6:
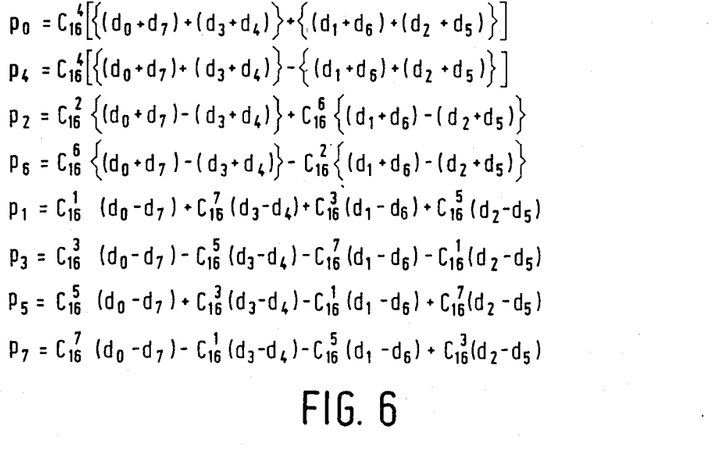
FIG. 6 shows the result of the product of eight input words with the 8×8 DCT matrix shown in FIG. 5.

For example, it holds that $a_{i,0} = D/\sqrt{2}$ which for N=8 corresponds to D cos [4π/16] and which is equal to $C^4_{16}$. In the case of a forward transform the relationship between the input words $d_k$, the product words $p_k$ and these transform elements $C^m_{2N}$ is shown in FIG. 6 for N=8. These equations can be rewritten in the way shown in FIG. 7. As is apparent from these equations, input words $d_k$ are multiplied by linear combinations of the transform elements $C^1_{16}$ to $C^7_{16}$. These linear combinations of transform elements are the previously mentioned multiplication factors supplied by the ROM 14.44.

Figure 8:
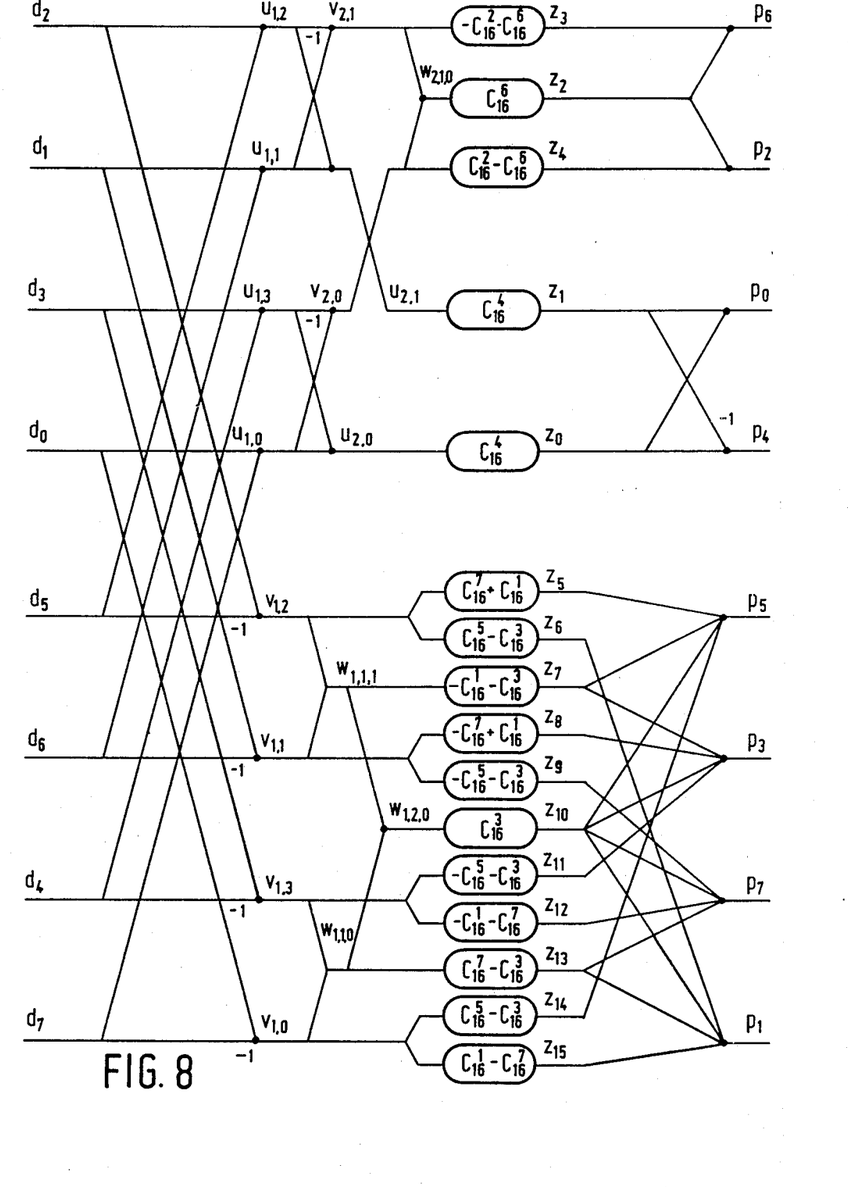
FIG. 8 shows a diagram of the DCT algorithm of FIG. 7.

The mathematically expressed forward transform shown in FIG. 7 for N=8 is shown in FIG. 8 in the form of a diagram. This diagram comprises a number of combination points which are marked by dots and at which the data words applied to such a dot are added together or subtracted from one another. In the latter case the digit −1 is indicated next to a branch terminating at said combination point. Futhermore a plurality of nodes is present from which a given data word is applied via different branches to different combination points.

It is apparent from this diagram that for the calculation of the product words $p_k$ it is possible to first add or subtract those data words which must be multiplied by the same multiplication factor. Only thereafter is the relevant multiplication performed. It is also apparent from this Figure that for each array of eight input words only 16 multiplications and 16 adding/subtracting operations preceding and following these multiplications need to be performer. In this respect it is to be noted that two or more multiplications do not occur in any branch of the diagram, which property is important for determining the word length of the intermediate results. In FIG. 8 these intermediate results are indicated by u, v and w. As is apparent from this diagram, the intermediate results are obtained in a plurality of successive iteration steps. In the first interation step the first-order sum words $u_{1,r}$ and the first-order difference words $v_{1,r}$ are obtained by performing adding and subtracting operations. The first-order sum words $u_{1,r}$ are converted in a second iteration step into second-order sum words $u_{2,r}$ and second-order difference words $v_{2,r}$. For the relationship between the q-th-order sum and difference words which are obtained in the q-th iteration step and the q-1st-order sum words obtained in the previous iteration step it generally holds that $$u_{q,r} = u_{q-1,r} + u_{q-1,2-q+1N-r-1} \quad (8a)$$

$$v_{q,r} = u_{q-1,r} - u_{q-1,2-q+1N-r-1} \quad (8b)$$

with
$r = 0, 1, 2, \ldots 2^{-q}N - 1$
$q = 1, 2, \ldots Q$
$u_{o,r} = d_r$
$u_{o,N-r} = d_{N-r}$ in which Q represents the largest integer which is smaller than or equal to $-1 + {}^2\log N$.

The sum words $u_{o,r}$ and $u_{o,N-r}$ will hereinafter be referred to as the zero-order words.

The difference words obtained in the q-th iteration step are subjected to a plurality of further iteration steps in which a plurality of auxiliary sum words is obtained from the difference words $v_{q,r}$. In the diagram shown in FIG. 8 the auxiliary sum word obtained in the j-th iteration step starting from the words $v_{q,r}$ is generally denoted by $w_{q,j,m}$ in which m is the ordinal number of the auxiliary sum word in the j-th iteration step. In conformity with the foregoing $w_{q,j,m}$ will be referred to as a j-th order auxiliary sum word. For the relationship between the j-th order and the j-1st order auxiliary sum words it holds that $$w_{q,j,m} = w_{q,j-1,m} + w_{q,j-1,2-q-j+1N-l-m} \quad (9)$$

with $m = 0, 1, 2, \ldots 2 \cdot 2^{-q-j}N - 1$
$j = 1, 2, 3, \ldots \log(2^{-q}N)$
$w_{q,o,m} = v_{q,m}$
$w_{q,o,2-qN-l-m} = v_{q,2-qN-l-m}$ The sum elements $u_{2,0}$ and $u_{2,1}$ (generally $u_{q,0}$ and $U_{Q,1}$), all difference words $v_{q,r}$ as well as all auxiliary sum words $w_{q,j,m}$ are multiplied by a suitably chosen multiplication factor and finally the sub-products obtained thereby are selectively combined with one another. This means that each time certain sub-products are added together or subtracted from one another in order to supply a product word $p_k$.

Figure 9:
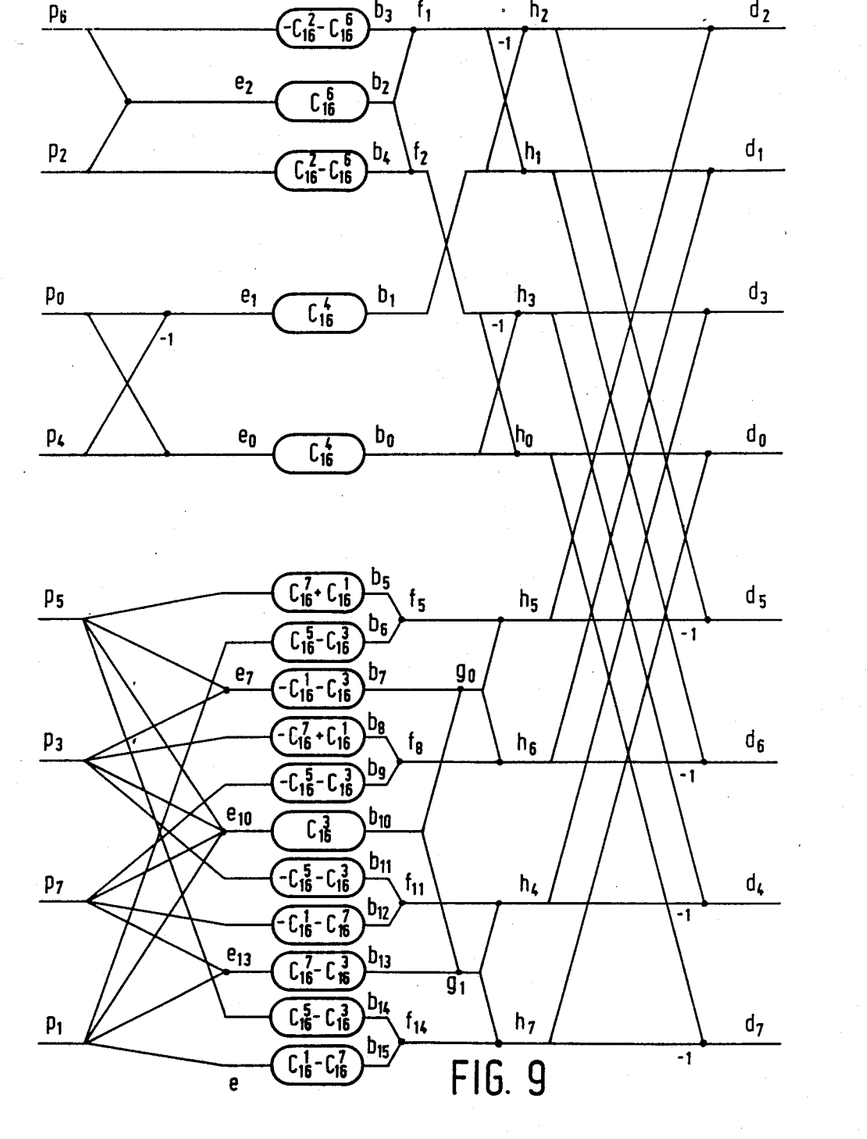
FIG. 9 shows a diagram of the inverse DCT algorithm, FIGS. 10(I) and 10(II) show a possible time diagram to explain the transformer shown in FIG. 4 which is programmed for performing the DCT algorithm shown in the diagram of FIG. 8, and FIGS. 11(I) and 11(II) show a time diagram to explain the transformer shown in FIG. 4 which is programmed for performing the inverse DCT algorithm shown in the diagram of FIG. 9.

It can now easily be verified that n inverse transform is the transform which is described in the diagram of FIG. 9 Comparison of the diagram of FIG. 8 with that of FIG. 9 shows that the latter follows from the first by transposing the first diagram of FIG. 8 (see Reference 5). This means that the signal direction is inverted therein, the combination points are replaced by nodes and the nodes are replaced by combination points.

(5) Operation of the One-dimensional Transformer

Figure 10:
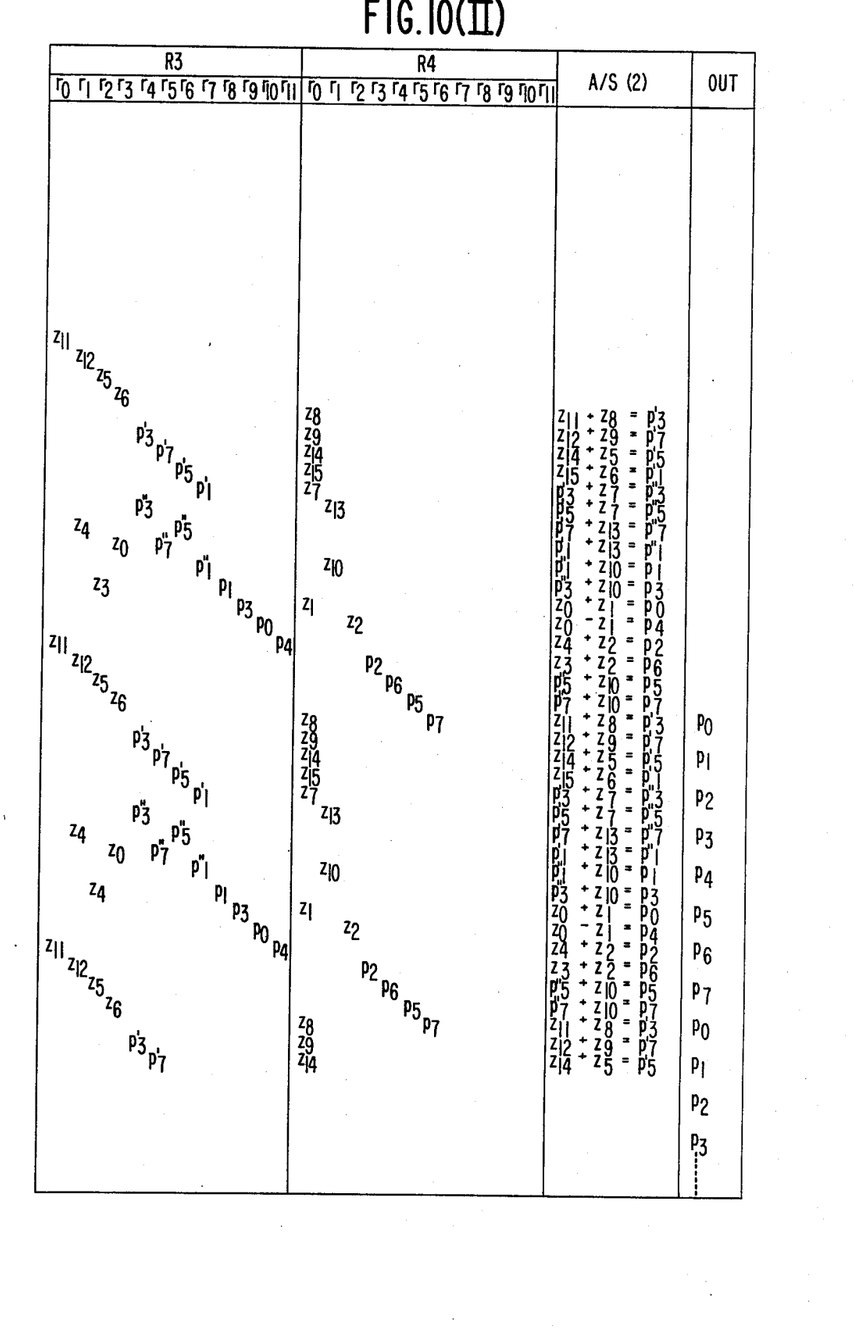
Figure 10I:
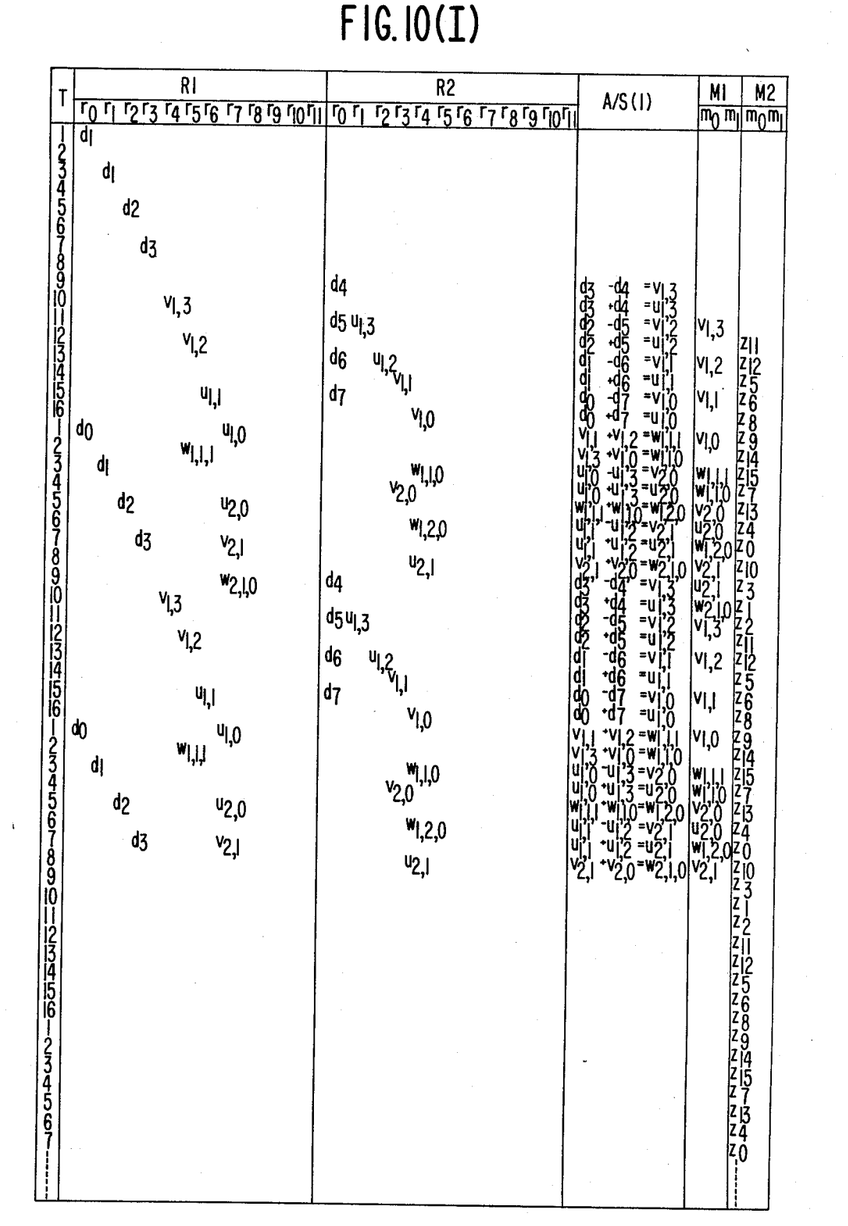

The operation of the one-dimensional transformer for performing the forward DCT algorithm defined in the previous section is shown diagrammatically in the time diagram of FIG. 10 which is self-evident. For the sake of completeness it is to be noted that in this FIG. 10 column T indicates the counting positions of the modulo-16-counter. The columns denoted by R1, R2, R3, R4, M1, M2 relate to the contents of the different register banks. More particularly the columns $r_0, r_1, \ldots$, and $m_o, m_1, \ldots$, indicate the contents of the relevant registers of these register banks. The columns denoted by A/S(1) and A/S(2) indicate which quantities at this counting position T of counter 14.47 are added together or are subtracted from one another in the adding/subtracting units A/S(1) and A/S(2), respectively. The column denoted by M2 indicates the sub-product supplied by the multiplier 14.43 and stored in the register $m_1$, $m_2$, $m_3$ or $m_4$ with the same designation as in FIG. 8. Finally the column denoted by OUT indicates the product words $p_k$ occurring at the output 14.21.

The following description may be given for a correct interpretation of this Figure. At the respective counting positions T=1, 3, 5, 7 input words $d_0$, $d_1$, $d_2$, $d_3$ are stored in the respective registers $r_0$, $r_1$, $r_2$, $r_3$ of register bank R1.

At T=9 $d_4$ is stored in register $r_0$ of R2. In the adding subtracting unit A/S(1) $d_4$ is now subtracted from $d_3$, resulting in $v_{1,3}$.

At T=10 $v_{1,3}$ is stored in register $r_4$ of R1 and in the adding/subtracting unit A/S(1) $d_4$ is also added to $d_3$, resulting in $u_{1,3}$.

At T=11 $u_{1,3}$ is stored in register $r_1$ of R2 and $V_{1,3}$ is stored in register $m_0$ of $M_1$ and multiplied by $-C^5{}_{16} - C^3{}_{16}$ so that the product $z_{11}$ is obtained. The input word $d_4$ is replaced by $d_5$ in register $r_0$ of R2 and in the adding/subtracting unit A/S(1) $d_5$ is subtracted from $d_2$ resulting in $v_{1,2}$.

At T=12 $v_{1,2}$ is stored in register $r_5$ of R1, $z_{11}$ is stored in register $m_0$ of M2, $d_2$ and $d_5$ are added together so that $u_{1,2}$ is obtained and $v_{1,3}$ in register $m_0$ of M1 is multiplied by $C^3{}_{16}$ thus resulting in the product $z_{12}$.

At T=13 $u_{1,2}$ is stored in register $r_2$ of R2, $z_{11}$ is stored in register $r_0$ of R3, $z_{12}$ is stored in register $m_0$ of M2. Furthermore $v_{1,2}$ is stored in register $m_0$ of M1 and multiplied by $C^7{}_{16} + C^1{}_{16}$ resulting in the product $z_5$. Furthermore $d_6$ is stored in register $r_0$ of R2 and $d_6$ is subtracted from $d_1$ so that $v_{1,1}$ is obtained. Corresponding operations are performed at the further counting positions of counter 14.47.

Since FIG. 10 accurately describes the data flow through the transformer, the contents of the memory 14.45 is fully defined thereby.

Figure 11:
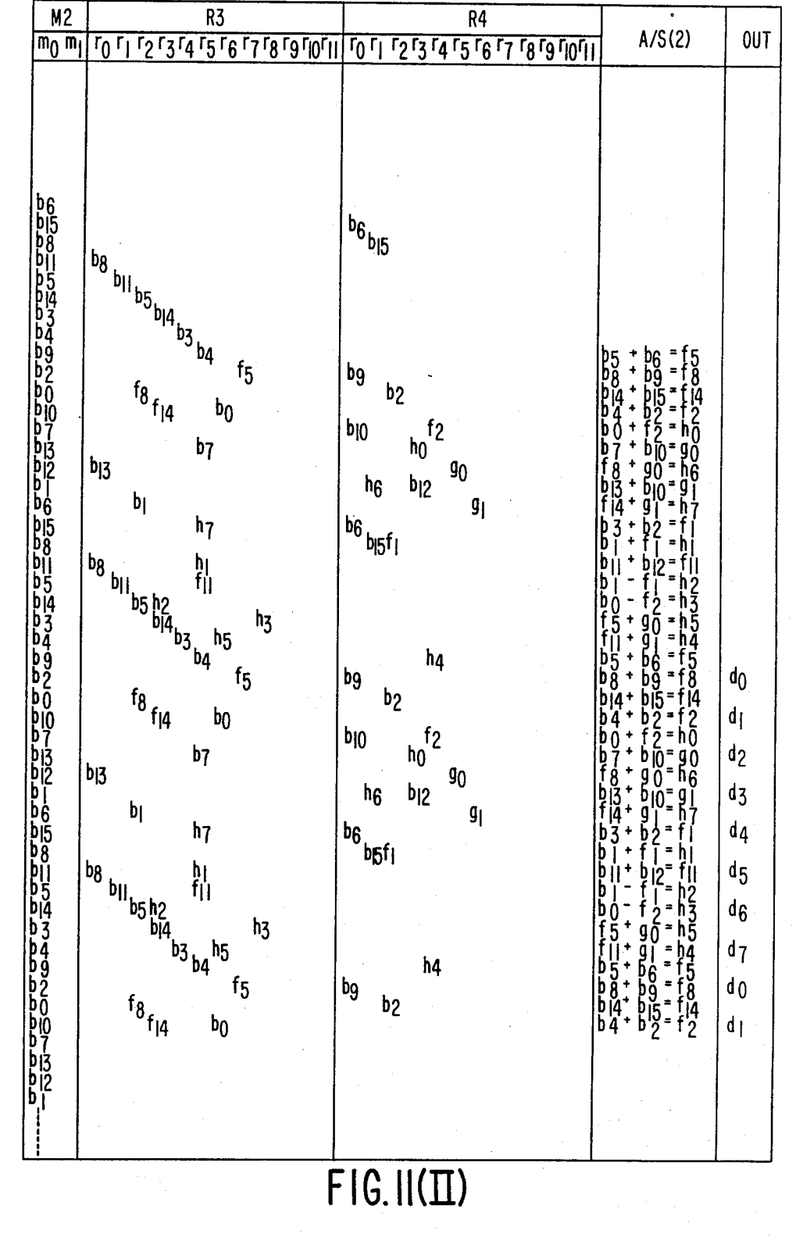
Figure 11I:
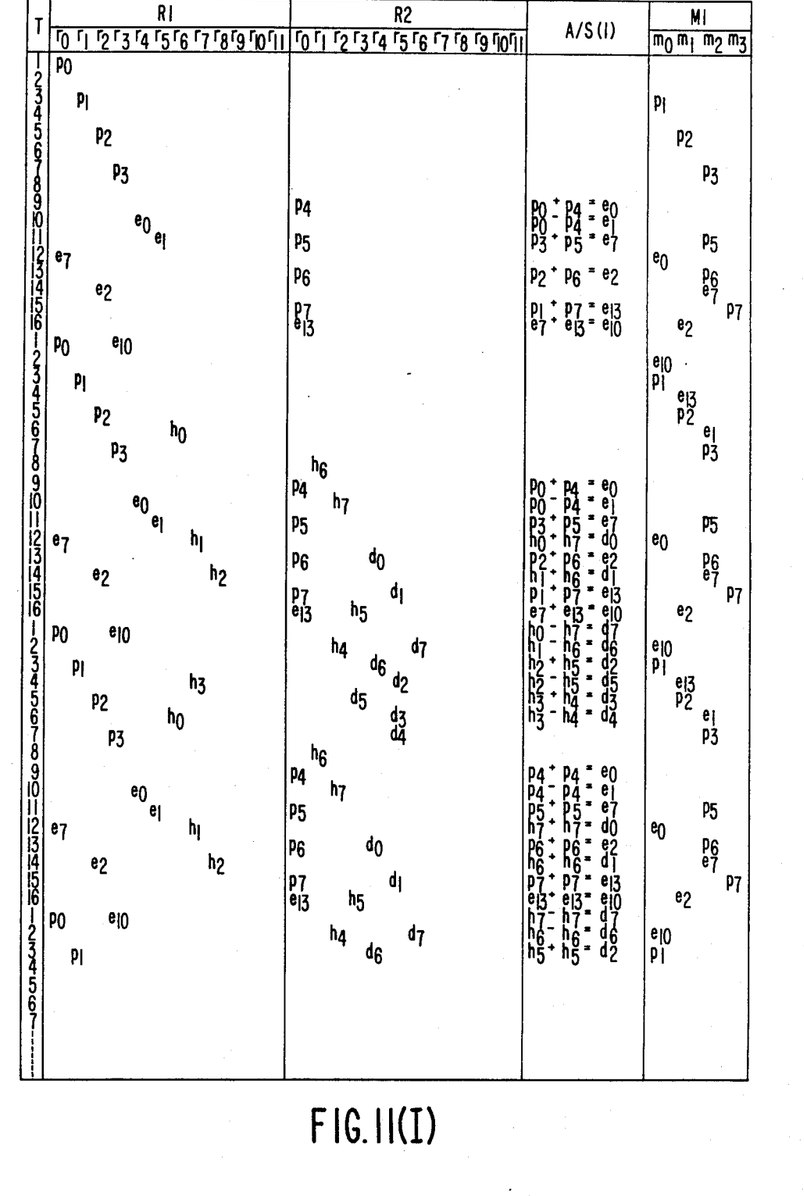

The operation of the one-dimensional transformer for performing the IDCT algorithm shown in FIG. 9 is indicated diagrammatically in the time diagram of FIG. 11. In this FIG. 11 the different columns have the same significance as those in FIG. 10. Furthermore it now also applies that the data flow indicated in this FIG. 11 uniformly defines the contents of the memory 14.45.

What is claimed is:

1. A one-dimensional transformer for multiplying a received series of N input words with a transform matrix of N×N predetermined transform elements for generating a series of N product words, which transformer is provided with:

an input bus connection (14.20) for receiving the input words;

an output bus connection (14.21) at which the product words occur;

a main input connection bus (14.22) which is connected to the input bus connection (14.20);

a main output connection bus (14.29) which is connected to the output bus connection (14.21);

a group of data connection buses (14.23; 14.24; 14.25);

a number of combination circuits (14.30, 14.31) each having an input bus connection (14.33; 14.35) and an output bus connection (14.34; 14.36) and each adapted to add or subtract each time two data words received successively at its input bus connection for supplying result words to its output bus connection, the output bus connections of said combination circuits being connected to particular respective data connection buses (14.23; 14.25);

a multiplier circuit (14.32) each having two input bus connections (14.37(1); 14.37(2)) and an output bus connection (14.38), the latter being connected to the remaining data connection bus (14.24) and the input bus connections being adapted to receive data words and multiplication factors, respectively, said multiplier circuit being adapted to multiply each received data word by an appropriate multiplication factor for generating an auxiliary product word at its output bus connection;

a multiplication factor memory (14.44) having addressable memory locations each adapted to store a multiplication factor, said multiplication factors being related to the transform elements and said memory being provided with a multiplication factor output bus (14.44(1)) which is connected to one of the input bus connections (14.37(2)) of the multiplier circuit;

a plurality of switching means (SW.) each controlled by associated control data (S.), each combination circuit and the multiplier circuit having associated there with one of said plurality of switching means, each switching means being adapted to connect selectively the input bus connection of the circuit with which they are associated at any instant to at most one of said connection buses which is not connected to the output bus connection of the relevant circuit;

further switching means (SW10, SW11, SW12) which are controlled by further control data (S10, S11, S12) for connecting selectively the main output connection bus (14.29) at any instant) to at most one of the data connection buses (14.23; 14.24; 14.25); and a control memory (14.45) having a control bus (14.46) which is connected to the said switching means and which is adapted to store at least the said control data and to supply selectively said control data to the control bus.

2. A one-dimensional transformer as claimed in claim 1 in which each combination circuit (14.30; 14.31) is provided with a first and a second register bank (R1, R2 and R3, R4, respectively) each having a plurality of registers which are accessible randomly by means of addresses, each register bank having a first and a second input and a first and second output, said first inputs being connected to the input bus connection of the combination circuit and said first outputs being connected to its output bus connection; two adding/subtracting units A/S(.) each having two inputs which are connected to the two outputs (14.39; 14.40; and 14.41; 14.42) of a respective one of the register banks (R1; R2; and R3; R4) for adding or subtracting the data words occurring at said second outputs for generating a result word at an output which is connected to each of the two second inputs, said adding/subtracting unit A/S(.) receiving a control command +/−(.) which indicates the operation (adding or subtracting) to be performed.

3. A one-dimensional transformer as claimed in claim 1 in which the multiplier circuit (14.32) has a first and a second further register bank (m1, M2) each having a plurality of registers which are randomly accessible by means of addresses, said first further register bank (M1) having an input which is connected to one of said two input bus connections (14.37(1)) of the multiplier circuit and an output, said second further register bank (M2) having an output which is connected to said output bus connection (14.38) of the multiplier circuit and an input, a multiplier (14.43) having a first input which is connected to the output of the first further register bank (M1), a second input which is connected to the other of said two input bus connections (14.37(2)) of the multiplier circuit for receiving multiplication factors to generate auxiliary product words at the output of said multiplier, said output being connected to an input of the second further register bank (M2).

4. a device for performing a linear one-dimensional transform on serially occurring multibit input data, provided with a one-dimensional transformer as claimed in claim 1, and further comprising first means (14.03(.)) or (14.06) which react to the serially occurring input data words for arranging these input data words into a first data array of N rows of N input data words each, said input data words of the array being applied successively and row by row as input words to the transformer (14.04(1)) or 14.04(2)).

5. A device for performing a linear two-dimensional transform on serially occurring multibit input data words which are representative of pixels of a television picture, and comprising a first and a second one-dimensional transformer each as claimed in claim 1, said device further comprising first means (14.03(.) or 14.06) which react to the serially occurring input data words for arranging these input data words in a first data array of N rows of N input data words each, said input data words of the array being applied successively and row by row as input words to the first one-dimensional transformer (14.04(1 or 14.04(2));

second means (14.05(.)) which receives the N series of N product words each supplied each time by the first transformer for arranging them in a first product array and which applies said product words in accordance with a second array, which is the transformed version of the first product array, successively and row by row as input words to the second one-dimensional transformer (14.04(2) or 14.04(1)).

6. A one dimensional transformer as claimed in claim 1, in which the transform matrix represents the discrete cosine matrix.

* * * * *